April 12, 1932.  C. S. SLINGERLAND ET AL  1,854,074
WINDSHIELD WIPER
Filed July 19, 1930  3 Sheets-Sheet 2
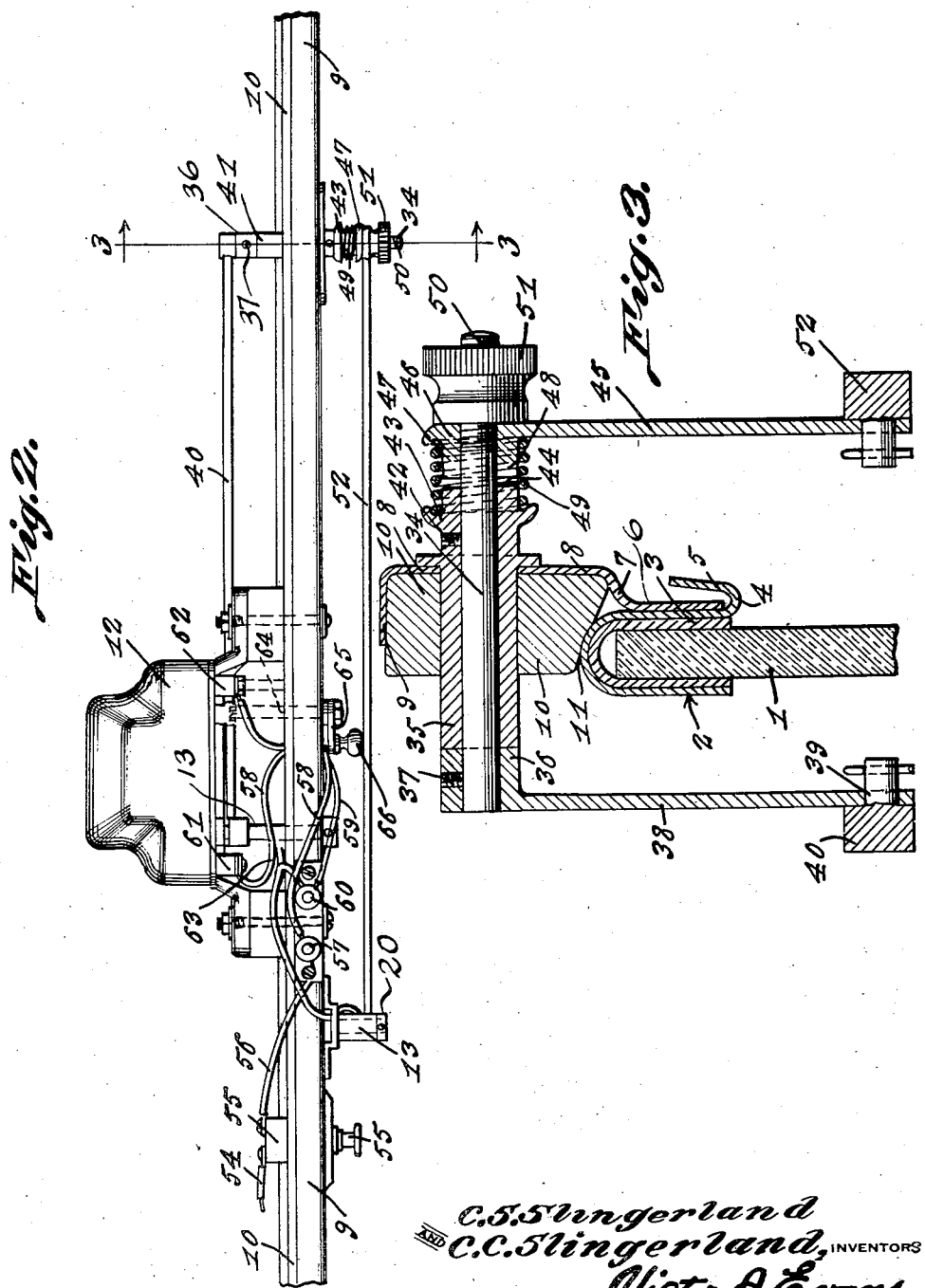

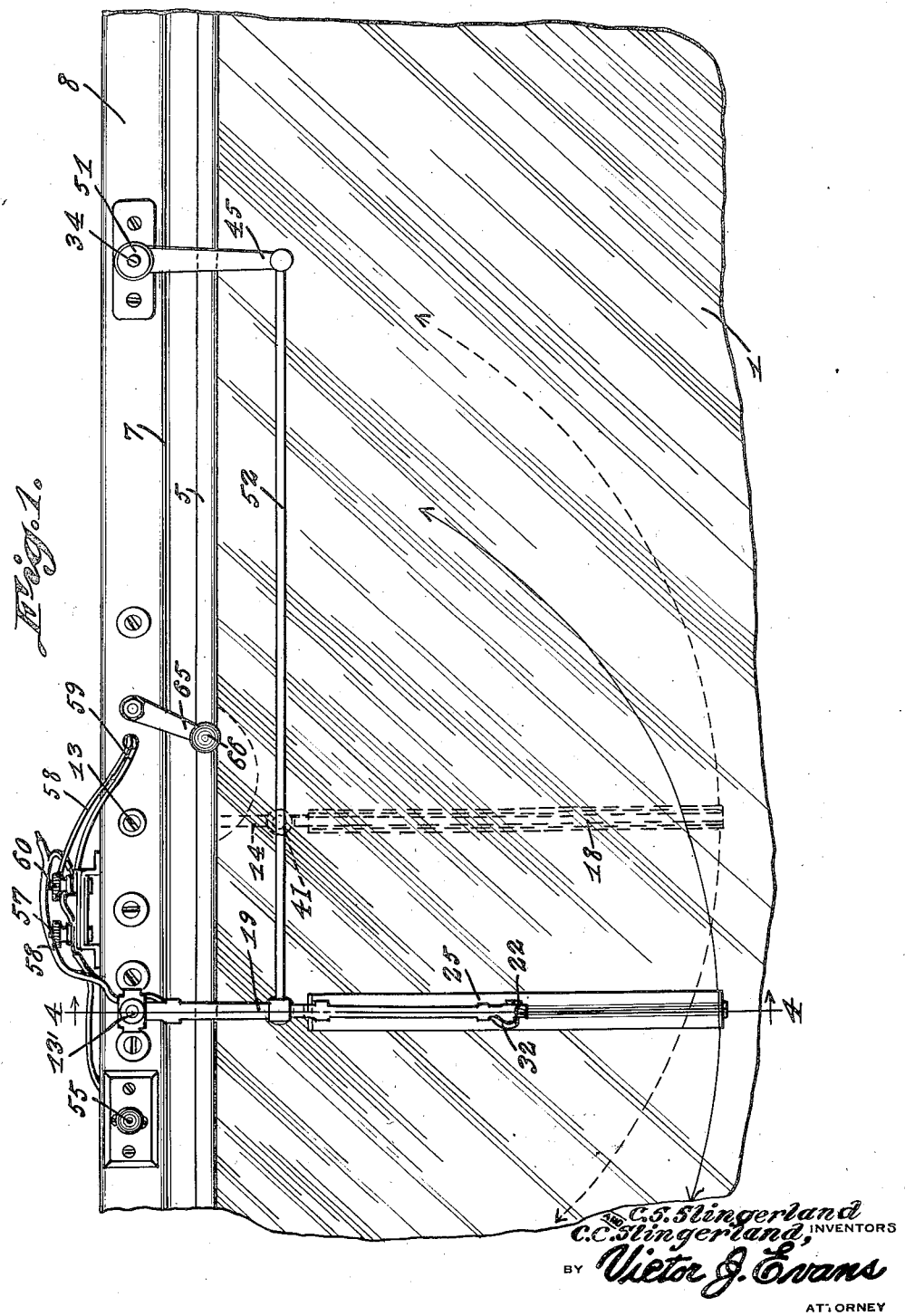

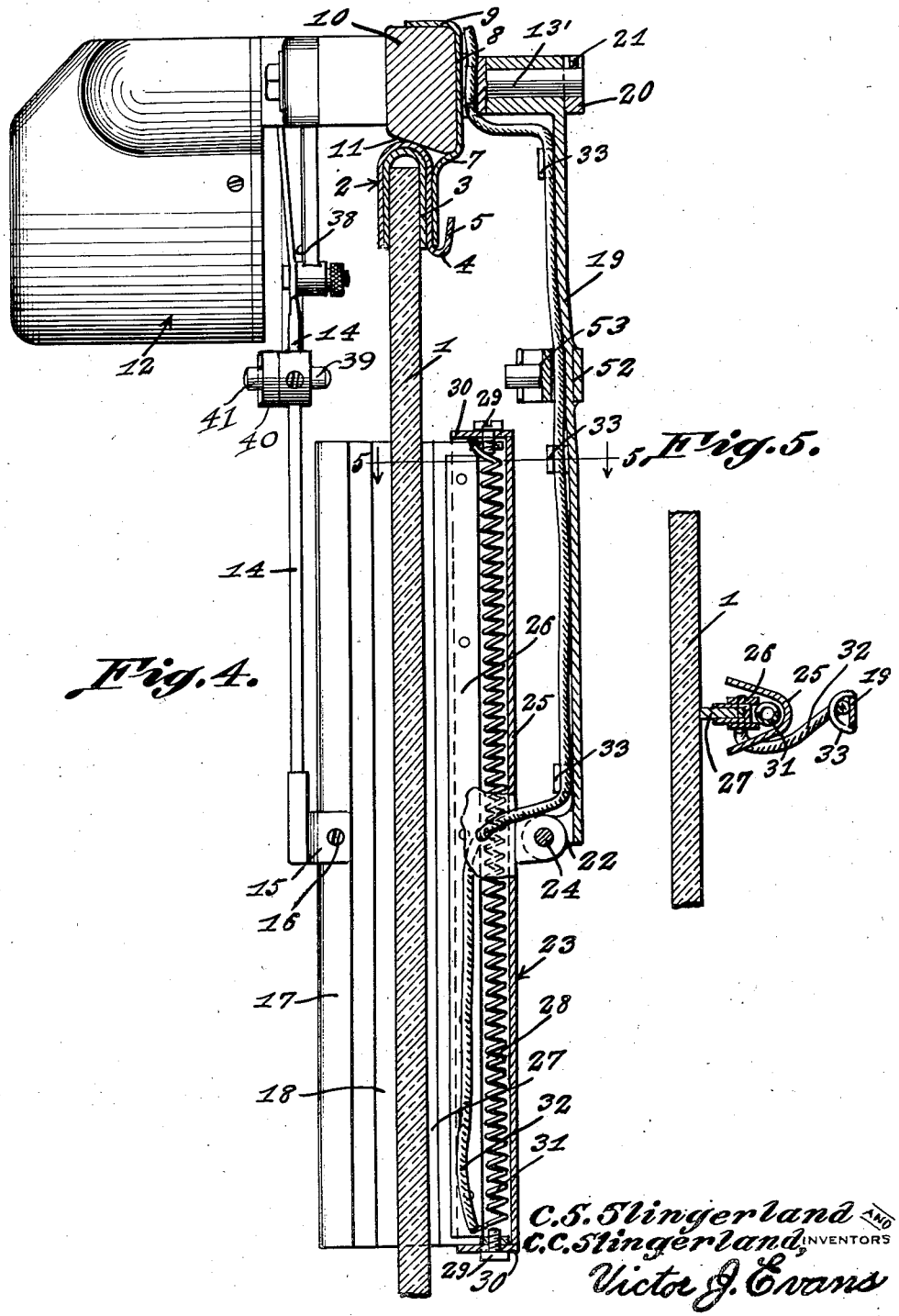

Patented Apr. 12, 1932

1,854,074

UNITED STATES PATENT OFFICE

CLAUDE S. SLINGERLAND AND CLAYTON C. SLINGERLAND, OF PORTVILLE, NEW YORK, ASSIGNORS OF ONE-THIRD TO AMELIA HOLLENBECK, OF PORTVILLE, NEW YORK

WINDSHIELD WIPER

Application filed July 19, 1930. Serial No. 469,159.

This invention relates to improvements in an automatic wind shield wiper for automobiles and has as its primary object to provide a device of this class embodying wipers for travel across the outer and inner surfaces of the wind shield pane, one of said wiping devices or units, namely the one for wiping contact with the outer face of the pane, being designed primarily for use in summer and spring months and the other wiping unit being designed for use in fall and winter months to remove condensed moisture from the inner surface of the wind shield pane.

Another object of the invention is to provide a novel means whereby both wind shield wiping units may be operated in unison or the unit for wiping the outer surface of a wind shield pane, employed alone.

Another object of the invention is to provide a wind shield pane wiper which may be conveniently applied to an ordinary wind shield frame, in proper position for use, without the necessity of drilling any holes through the pane or frame of the wind shield and, at the same time securely held against any displacement with respect to the wind shield.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing our invention in detail, reference will be had to the accompanying drawings, wherein like characters denote like or corresponding parts throughout the several views, and in which:

Figure 1 is a view in elevation of the wind shield wiper attachment embodying the invention, one of the wiper units being shown in broken lines.

Figure 2 is a top plan view of the attachment installed upon the wind shield.

Figure 3 is a detail vertical front to rear sectional view taken on the line 3—3 of Figure 2, looking in the direction indicated by the arrows.

Figure 4 is a similar view on the line 4—4 of Figure 1, looking in the direction indicated by the arrows.

Figure 5 is a detail horizontal sectional view on the line 5—5 of Figure 4, looking in the direction indicated by the arrows.

In the drawings the wind shield wiper is illustrated as adapted to the pane 1 of the wind shield. The device comprises a channeled supporting member which is indicated in general by the numeral 2, and this member is preferably formed from resilient sheet metal and is U-shaped in cross section, and the member is provided upon its inner side with a lining 3 of soft rubber, leather, or any other yieldable material which will adapt the said channeled member to be frictionally held in place upon the upper edge of the wind shield pane. The rear side of the member 2, or in other words, the side which is engaged with the inner side of the pane 1, is formed with an arcuate bend 4 so as to provide an upstanding flange 5 which is spaced from the said rear side of the channeled member and riveted, welded, or otherwise secured to the exposed face of the rear side of the channeled member is a longitudinal plate 6 which is offset near the top of the channeled member as indicated by the numeral 7 and thence extended vertically upwardly as indicated by the numeral 8, and has its upper portion turned at right angles to the portion 8 to provide a portion 9 extending forwardly or outwardly from the portion 8. A longitudinal strip 10 of wood or other suitable material is of a contour to adapt it to fit against the forward side of the portion 8, and under side of the portion 9 of the said member, and the lowerside of the strip 10 is inclined upwardly and forwardly as indicated by the numeral 11 so that the rear side of the bottom of the member 10 may rest upon the offset 7 and the inclined bottom surface may rest upon the bend at the top of the channeled member 2.

The numeral 12 indicates in general an electrically operated prime mover, and the same is mounted in an appropriate casing and inasmuch as it is of the type ordinarily employed for operating an oscillating pane wiper, a specific description thereof is unnecessary. The numeral 13 indicates a short spindle which is journalled in the portion 8 of the plate 6 and in the strip 10, and suspended from the outer or forward end of this spindle is an arm 14 which is provided at its lower end with a head 15 pivotally connected as at 16 to the back 17 of a pane wiper comprising, in addition to the said back 17, a wiper strip 18, which may be of any material found suitable for the purpose. A similar arm 19 is suspended from a spindle 13′ and this arm is held against outward displacement by means of a collar 20 which is fitted to this end of the spindle and held in place by a set screw 21. The arm 19 is also provided, at its lower end, with a head 22 and the wiper unit indicated in general by the numeral 23 is pivotally mounted, intermediate its upper and lower ends, upon the said head 22, by a pivot pin 24. This wiper unit includes a housing which is substantially V-shaped in horizontal section, the housing being indicated by the numeral 25, and a back 26 corresponding to the back 17 is mounted within this housing and a wiper strip 27 of felt or any other appropriate material is arranged within the said back and this strip is designed to wipe over the inner surface of the wind shield pane and, disposed at the rear side of the back 26, is an electrical resistance heating unit comprising a core 28 of insulating material confined at its ends by screws 29 fitted through cross pieces 30 at the top and bottom of the housing 25.

A resistance coil 31 is wound about the core and a conductor 32 is connected to the lower end of the coil and is led upwardly along the forward side of the arm 19 and through guide clips 33 which are formed integral with the said arm and bent to substantially arcuate form.

The spindles 13 and 13′ are relatively offset laterally and the end of the arm 14 is fixed upon the respective end of the spindle 13 and the prime mover 12 is so constructed and operates in such a manner as to impart oscillatory movement to the said shaft. The arm 19 is therefore moving with the said spindle. However, the arm 19 is loosely fitted to the spindle 13′ and means is provided as will now be described, for transmitting motion to both of the arms under conditions to be presently explained. This means comprises a spindle 34 which is mounted in a bushing 35 in turn mounted in the portion 8 of the plate 6 and in the strip 10 and fixed upon one end of this spindle by a collar 36 and set screw 37, is an arm 38 which extends downwardly and has pivotally connected, as indicated by the numeral 39 one end of a connecting rod 40 which is led to and pivotally connected with the arm 14 as indicated by the numeral 41. The bushing 35 is rotatable within the said portion 8 of the plate 6 and also in the opening in the strip 10 and is held for rotation with the shaft by a set screw 42. The end of the bushing 35 which constitutes the rear or inner end of said bushing, is provided with a circumscribing cupped flange 43, and also with a clutch face 44.

An arm 45 corresponding to the arm 38 is provided at its upper end with a head 46 which is freely mounted upon the spindle 34 and this collar is also provided with a cupped flange 47 extending part way around the same and the collar, at its end with opposes the end of the bushing 35, is formed with a clutch face 48. A compression spring 49 is arranged upon the end of the bushing 35 and the collar 46 and bears at its ends against the flanges 43 and 47, and therefore yieldably holds the clutch face 48 of the collar 36 out of engagement with the clutch face 44 of the bushing 35. The end of the spindle 34 upon which the collar 46 is fitted is threaded as indicated by the numeral 50 and a thumb nut 51 is threaded onto this end of the stem and bears against the upper end of the arm 45 and at this point it will be understood that so long as the clutch faces are out of mutual engagement with each other, the arm 38 and spindle 34 will oscillate without any oscillatory motion being imparted however to the arm 45. However, when it is desired to use the wiper unit 23, the thumb nut 51 is adjusted so as to effect engagement of the clutch face 48 with the clutch face 44, and therefore when oscillatory motion is imparted to the arm 38 and spindle 34 similar motion will also be imparted to the arm 45 and to a connecting rod 52 which is pivotally connected to the lower end of the said arm 45 and pivotally connected at its other end as at 53 to the arm 19.

The numeral 54 indicates a conductor wire which leads to one terminal of a push pull switch 55 which is mounted upon one end of the strip 10, and a wire 56 leads from the other terminal of this switch to a binding post 57 and a conductor 58 is led from the said binding post and also another conductor wire 59 is led from another binding post 60 to the terminals 61 and 62 respective of the prime mover 12. Another conductor wire 63 leads from the binding post 60 and this wire leads to the thermal unit comprising the core 28 and coil 31.

As is customary the prime mover 12 includes a switch and the stem 64 is connected with this switch and led through the strip 10, and the plate portion 8 and a switch arm 65 is mounted upon the end of this stem and is provided with a finger knob 66 whereby it may be swung into and out of position to actuate the switch within the prime mover casing and thus close or break the circuit thereto.

From the foregoing description it will be understood, as before stated, that in spring and summer months, it will not be necessary to employ the wiper which coacts with the inner surface of the wind shield pane and therefore at such time the nut 51 will be adjusted to permit the spring 49 to separate the clutch face 48 from the clutch face 44 whereupon the arm 45 and the arm 19 carrying the wiper unit 23 will remain idle.

What we claim is:

A windshield wiper comprising a support, a motor attached thereto, a spindle journaled transversely in the support, a wiping element operatively connected with the motor and said spindle, an arm journaled upon said spindle, a second wiper connected with said arm, clutch elements connected to said spindle and said arm, said arm being journaled upon such spindle for selectively coupling the second wiping element for movement with the first mentioned wiping element, a spring for separating the clutch elements and means movable in opposition to the spring for effecting engagement of the clutch elements.

In testimony whereof we affix our signatures.

CLAUDE S. SLINGERLAND.
CLAYTON C. SLINGERLAND.